United States Patent [19]
Plummer et al.

[11] Patent Number: 5,985,429
[45] Date of Patent: Nov. 16, 1999

[54] POLYMER FIBER COMPOSITE WITH MECHANICAL PROPERTIES ENHANCED BY PARTICLE SIZE DISTRIBUTION

[75] Inventors: David A. Plummer, Columbia Heights, Minn.; Michael J. Deaner, Osceola, Wis.; Kurt E. Heikkila, Circle Pines, Minn.

[73] Assignee: Andersen Corporation, Bayport, Minn.

[21] Appl. No.: 08/476,856

[22] Filed: Jun. 7, 1995

Related U.S. Application Data

[63] Continuation-in-part of application No. 08/224,396, Apr. 7, 1994, abandoned, which is a continuation of application No. 07/938,364, Aug. 31, 1992, abandoned.
[51] Int. Cl.$^6$ ...................................... B32B 19/00
[52] U.S. Cl. .......................... 428/220; 428/357; 428/375; 428/392; 428/393; 428/394
[58] Field of Search ..................... 428/220, 357, 428/375, 392, 393, 394

[56] References Cited

PUBLICATIONS

Maldas, "PVC Composites" Int. S. Poly. Mat., vol. 17, pp. 205–214 (1992).
Dosmi, "Structure Property Relationships" Poly. Comp. v. 10, N. 1, pp. 28–38 (1989).
Rogalski, "PVC Wood Fiber Composites" Antez 87', pp. 1436–1440, (1987).
Sean, "Mechanism properties study", Dreuvysk, v. 133, pp. 25–39 (1992).
Maldas et al. CA# 119: 9733 (1992).

*Primary Examiner*—Johann Richter
*Assistant Examiner*—Patrick R. Delaney
*Attorney, Agent, or Firm*—Merchant, Gould, Smith, Edell, Welter & Schmidt P.A.

[57] ABSTRACT

The invention relates to a composition comprising a polymer, a short and a long fiber composite that can be used in the form of a linear extrudate or thermoplastic pellet to manufacture structural members. The linear extrudate or pellet can have a cross-section of any arbitrary shape, or can be a regular geometric. The polymer and short/long fiber composite containing structural members can be manufactured from the composite or pellet in an extrusion process or an injection molding process. The pellet can have a cross-section shape having a volume of at least about 12 mm$^3$. Preferably the pellet is a right cylindrical pellet having a minimum radius of about 1.5 mm and a minimum length of 1 mm weighing at least 14 mg. The initial mixing step before extrusion of the composite material insures substantial mixing and melt contact between molten polymer and wood fiber. The extruded pellet comprises a consistent proportion of polymer, short and long fiber and water. During the extrusion, water is removed intentionally to dry the material to a maximum water content of less than about 10 wt-% based on the pellet weight. To make a structural unit, the pellet is introduced into an extruder or injection molding apparatus wherein, under conditions of temperature and pressure, the composite pellet material is shaped into a useful cross-section.

31 Claims, 3 Drawing Sheets

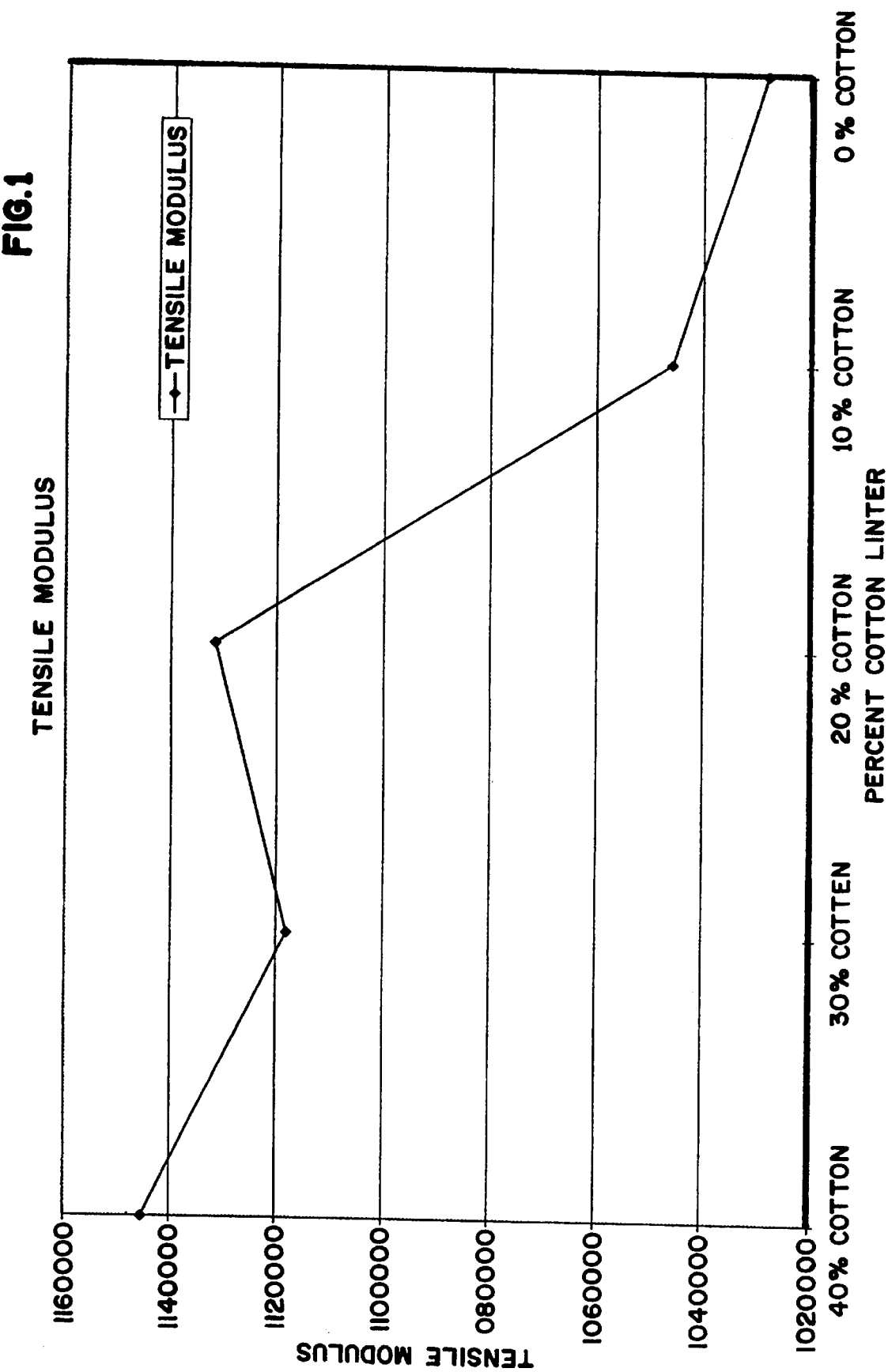

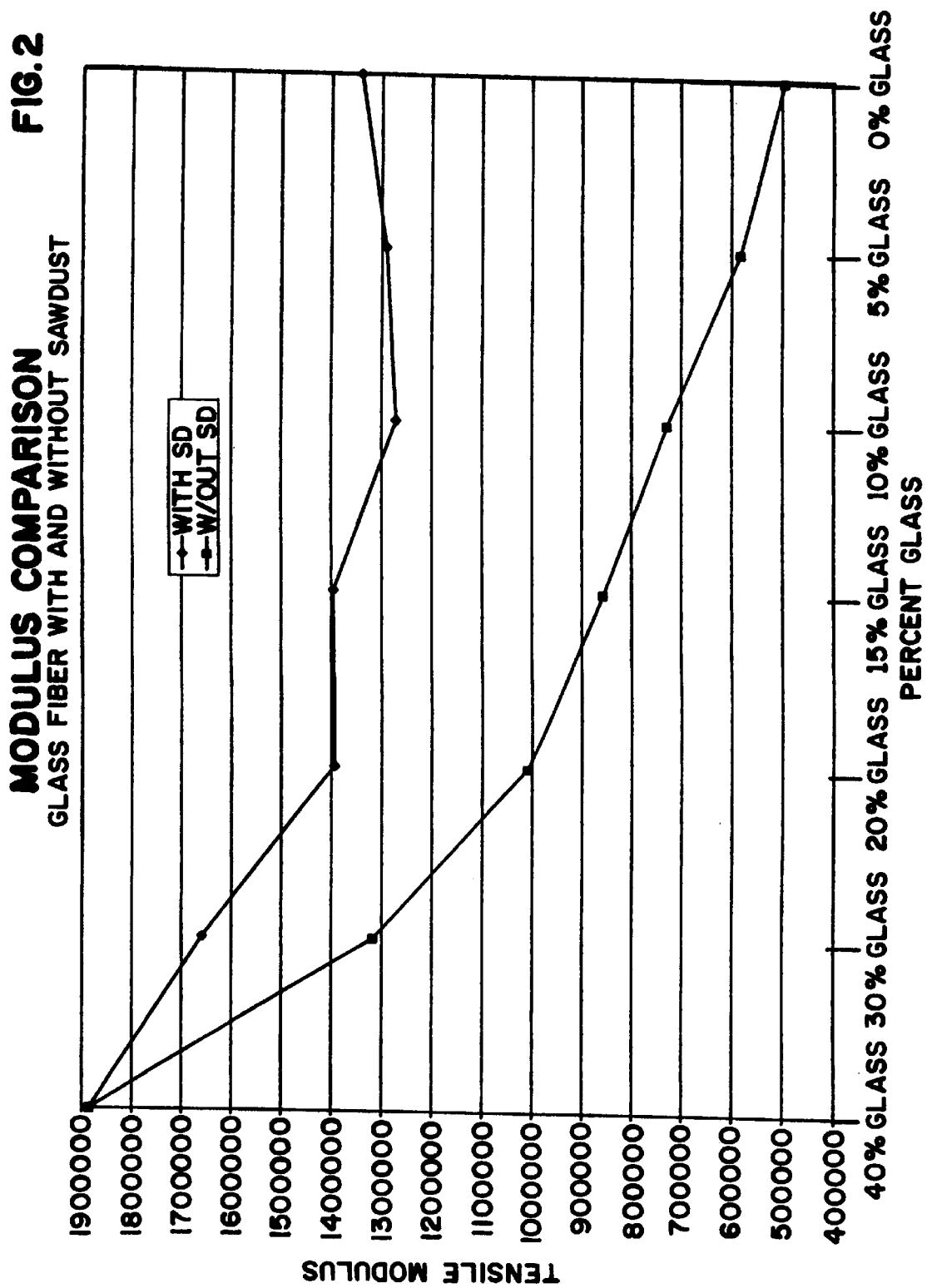

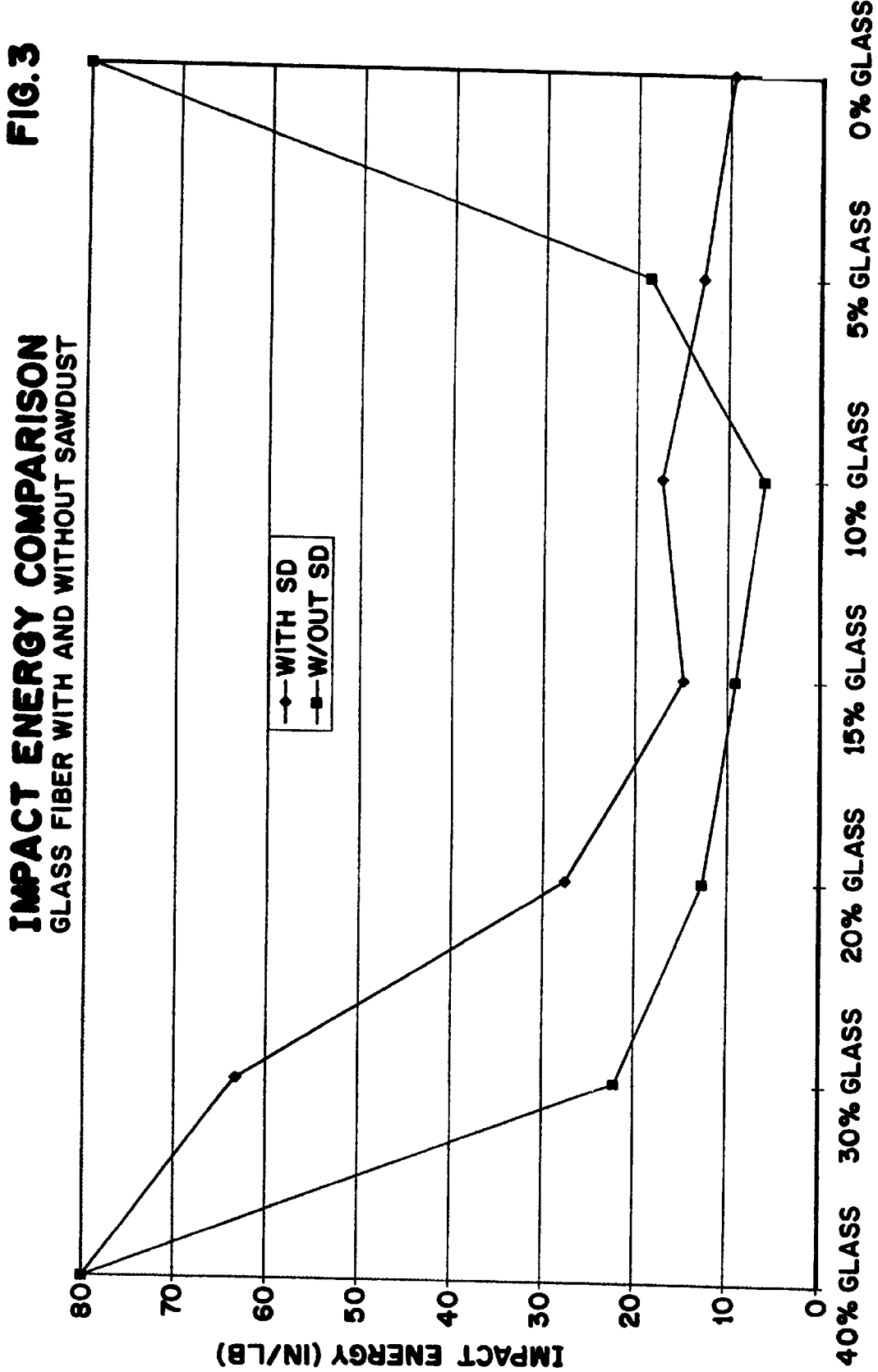

POLYMER FIBER COMPOSITE WITH MECHANICAL PROPERTIES ENHANCED BY PARTICLE SIZE DISTRIBUTION

RELATED APPLICATIONS

This application is a Continuation-in-Part application of Deaner et al., U.S. Ser. No. 08/224,396, filed Apr. 7, 1994, now abandoned which is a Continuation application of Deaner et al., U.S. Ser. No. 07/938,364, filed Aug. 31, 1992, now abandoned.

FIELD OF THE INVENTION

The invention relates to composite polymer/fiber thermoplastic materials used for the fabrication of structural members. Such a member can be any structural unit, but are preferably for use in windows and doors for residential and commercial architecture. These polymer/fiber composite materials include an fiber blend that provides optimal engineering properties. The composite can also contain an optional, intentional recycle of by-product streams, from window and door manufacture, of polymer, adhesive, paint, etc. More particularly, the invention relates to an improved composite material adapted to extrusion or injection molding processes for forming structural members that have improved properties when used in windows and doors. The composite materials of the invention can be made to manufacture structural components such as rails, jambs, stiles, sills, tracks, stop and sash, nonstructural trim elements such as grid, cove, bead, quarter round, etc.

BACKGROUND OF THE INVENTION

Conventional window and door manufacture has commonly used wood and metal components in forming structural members. Commonly, residential windows are manufactured from milled wood products that are assembled with glass to form typically double hung or casement units. Wood windows while structurally sound, useful and well adapted for use in many residential installations, can deteriorate under certain circumstances. Wood windows also require painting and other periodic maintenance. Wooden windows also suffer from cost problems related to the availability of suitable wood for construction. Clear wood products are slowly becoming more scarce and are becoming more expensive as demand increases. Metal components are often combined with glass and formed into single unit sliding windows. Metal windows typically suffer from substantial energy loss during winter months.

Extruded thermoplastic materials have been used in window and door manufacture. Filled and unfilled thermoplastics have been extruded into useful seals, trim, weatherstripping, coatings and other window construction components. Thermoplastic materials such as polyvinyl chloride have been combined with wood members in manufacturing PERMASHIELD® brand windows manufactured by Andersen Corporation for many years. The technology disclosed in Zanini, U.S. Pat. Nos. 2,926,729 and 3,432,883, have been utilized in the manufacturing of plastic coatings or envelopes on wooden or other structural members. Generally, the cladding or coating technology used in making PERMASHIELD® windows involves extruding a thin polyvinyl chloride coating or envelope surrounding a wooden structural member. Recent advances have made a polyvinyl chloride/cellulosic fiber composite material useful in the manufacture of structural members for windows and doors. Puppin et al., U.S. Pat. No. 5,406,768 comprise a continuous phase of polyvinyl chloride and a particular wood fiber material having preferred fiber size and aspect ratio in a thermoplastic material that provides engineering properties for structural members and for applications in window and door manufacture. These thermoplastic composite materials have become an important part of commercial manufacture of window and door components. While these materials are sufficiently strong for most structural components used in window and door manufacture, certain components require added stiffness, tensile strength, elongation at break or other engineering property not always provided by the materials disclosed in Puppin et al.

Polyvinyl chloride has been combined with wood fiber to make extruded materials. However, such materials have not successfully been used in the form of a structural member that is a direct replacement for wood. Common thermoplastic composite materials cannot provide similar thermal and structural properties to wood. These extruded materials fail to have sufficient modulus, compressive strength, coefficient of thermal expansion that matches wood to produce a direct replacement material. Further, many prior art extruded composites must be milled after extrusion to a final useful shape. Typical commodity thermoplastic compositions have achieved a modulus no greater than about 500,000. One class of composite, a polyvinyl chloride/wood flour material, poses the added problem that wood dust, which can accumulate during manufacture, tends to be explosive at certain concentrations of wood flour in the air. Most commonly, poly vinyl chloride, polystyrene and polyethylene thermoplastics have been used in such products. The prior art has used a various fiber having a large distribution of fiber sizes. No attention has been given to the improvement of engineering properties using a novel distribution of fiber sizes.

Accordingly, a substantial need exists for a composite material that can be made of polymer and fiber. The improved fiber can contain an optional, intentional recycle of a waste stream. A further need exists for a composite material that can be extruded into a shape that is a direct substitute for the equivalent milled shape in a wooden or metal structural member. This need requires a coefficient of thermal expansion that approximates wood, a material that can be extruded into reproducible stable dimensions, a high compressive strength, a low thermal transmission rate, an improved resistance to insect attack and rot while in use and a hardness and rigidity that permits sawing, milling, and fastening retention comparable to wood members.

BRIEF DISCUSSION OF THE INVENTION

We have found that an improved substitute for composite, wood and metal structural members and the problems relating to the recycle of waste streams in window manufacture can be solved by forming a polymer/fiber composite material into window and door structural members. We have found a threshold level of addition of high aspect ratio first fiber to short aspect ratio second fiber in a PVC composite that produces enhanced properties. The blend of long or high aspect ratio fiber and short aspect ratio fiber produces a substantial increase in tensile modulus and also improves impact energy for composites. Such improved physical properties increase the utility of such materials and the manufacture of structural members used in window and door manufacture for institutional, commercial or residential construction. Importantly, we have found that the dimensions of the discontinuous fiber in the fiber phase of a polymer fiber composite has an important impact on engineering properties.

Additionally, the use of different types of fiber having varied fiber particle sizes also has an important impact on engineering properties. We have found that blending a short aspect ratio wood fiber with a fiber of enhanced aspect ratio improves strength tensile modulus and impact energy of the composite material. We believe the interaction between the polymer phase and the fiber phase as the polymer wets, coats and becomes intimately associated with the fiber provides a composite with an internal reinforcing structure superior to prior art structures having relatively uniform fiber dimensions.

The thermoplastic polymer can be combined with a proportion of a first long fiber and a proportion of a second short fiber to form a polymer/wood fiber composite, preferably in the form of a pellet. The fiber comprises a large number of first long fiber and a large number of second short fiber providing enhanced structural properties.

We have found that the PVC and wood fiber composite can be manufactured into acceptable substitutes for wooden members if the PVC and wood material contains less than about 10 wt-%, preferably less than 3.5% of water based on pellet weight. The compositions can achieve in a final product high modulus, high compressive strength, reproducible, stable dimensions and a superior modulus of elasticity. We have also found that the successful manufacture of structural members for windows and doors requires the preliminary manufacture of the polyvinyl chloride wood fiber composite in the form of a pellet wherein the materials are intimately mixed and contacted in forming the pellet prior to the extrusion of the members from the pellet material. We have found that the intimate mixing of the polyvinyl chloride, wood fiber, second fiber and waste in the manufacture of the pellet process with associated control of moisture content produces a pelletized product that is uniquely adapted to the extrusion manufacture of PVC/wood fiber components and achieves the manufacture of a useful wood replacement product.

A variety of fibers can be used including metal fibers, synthetic fibers, natural fibers, inorganic fibers, and others. A variety of second fibers can be used. Such fibers can be manufactured from metal, natural sources, synthetic fibers, inorganic fibers, and mixtures thereof. Any source of fiber having the required particle size and aspect ratio prescribed in this application can be used as a second fiber. Metal fibers that can be used in the invention include steel, stainless steel, aluminum, titanium, copper and others. Natural fibers that can be used in the invention include fibers derived from jute, flax, hemp, ramie, cotton, kapok, coconut, palm leaf, sisal, and others. Synthetic fibers that can be used in the manufacture of the composites of the invention include cellulose acetate, acrylic fibers such as acrylonitrile, methylmethacrylate fibers, methylacrylate fibers, and a variety of other basic acrylic materials including homopolymers and copolymers of a variety of acrylic monomers; aramid fibers which comprise polyamides having about 85% or more of amide linkages directly attached to two aromatic rings, nylon fibers, polyvinylidene dinitryl polymers. Polyester including polyethylene teraphthlate, polybutylene teraphthlate, polyethylene naphthalate, rayon, polyvinylidene chloride, spandex materials such as known segmented polyurethane thermoplastic elastomers, vinyl alcohol, and modified polyvinyl alcohol polymers and others. Inorganic fibers can be used. Such fibers can be carbon fibers, silicate fibers, boron fibers, etc. Lastly, glass fibers can be used including a variety of silica glasses, borosilicate glasses, alumino-silicate glasses, etc. Such fibers can be used as manufactured but also can contain coatings and exterior fiber treatments that improve glass fiber polymer compatibility.

An important aspect of the fiber are the fiber dimensions. The long or high aspect ratio fiber has maximum dimensions of preferably 0.005 mm to 0.01 resulting in increased aspect ratio. The typical aspect ratio of the first long or high aspect ratio fiber after processing into a composite is greater than 30, preferably greater than 50 and most preferably greater than 100. Aspect ratio is typically defined as the fiber length divided by the fiber thickness. We have found that combining the short fibers disclosed below with the long fibers of this section provides a substantial improvement in engineering properties. We have found that they are substantially improved using the fiber blends disclosed herein.

BRIEF DESCRIPTION OF THE DRAWINGS

FIG. 1 is a graphical representation of the tensile modulus of the composite material of the invention using wood fiber and a high aspect ratio cotton linter fiber. The cotton linter has an aspect ratio of greater than about 50. Substantial proportions of the cotton linter material represented in the figure as a percentage of total composite shows an improvement in tensile modulus at 40% cotton fiber content.

FIG. 2 is a similar graphical representation of tensile modulus in a wood fiber-high aspect ratio glass fiber composite with polyvinyl chloride. The combination of glass fiber and wood fiber shows a surprisingly improved tensile modulus throughout the range of second fiber.

FIG. 3 is a similar graphical representation of a composite comprising polyvinyl chloride and a wood fiber/high aspect ratio glass fiber mixed fiber showing a surprising increase in impact especially at lower fiber levels.

DETAILED DESCRIPTION OF THE INVENTION

The invention relates to the use of a thermoplastic polymer, a first long fiber and a second short fiber in a composite material with a controlled water content in the form of a pelletized material wherein the fiber blend is intimately contacted and wetted by the organic materials. The intimate contact and wetting between the components in the pelletizing process ensures high quality physical properties in the extruded composite materials after manufacture. Preferred materials are plasticizer free.

Pellet

The polymer and fiber can be combined and formed into a pellet using a thermoplastic extrusion processes. Fiber can be introduced into pellet making process in a blend of sizes. The best appearing product with maximized structural properties are manufactured within a range of particle size and aspect ratio as set forth below. Further, large particle wood fiber can be reduced in size by grinding or other similar processes that produce a fiber similar to sawdust having the stated dimensions and aspect ratio. One further advantage of manufacturing sawdust of the desired size is that the material can be pre-dried to a reduced water content (1–10 wt-%) before introduction into the pellet or linear extrudate manufacturing process. Further, the wood fiber can be pre-pelletized into pellets of wood fiber with small amounts of binder if necessary.

During the pelletizing process for the composite pellet, the polymer and fiber mix are intimately contacted at high temperatures and pressures to insure that the fiber and polymeric material are wetted, mixed and extruded in a form such that the polymer material, on a microscopic basis, coats and flows into the pores, cavity, etc., of the fibers. The fibers are preferably substantially oriented by the extrusion process in the extrusion direction. Such substantial orientation causes overlapping of adjacent parallel fibers and polymeric coating of the oriented fibers resulting a material useful for manufacture of improved structural members with improved physical properties. The degree of orientation is about 20%, preferably 30% above random orientation which is about 45 to 50%. The structural members have substantially increased strength and tensile modulus with a coefficient of thermal expansion and a modulus of elasticity that is optimized for window and doors. The properties are a useful compromise between wood, aluminum and neat polymer.

Moisture control is an important element of manufacturing a useful linear extrudate or pellet. Depending on the equipment used and processing conditions, control of the water content of the linear extrudate or pellet can be important in forming a successful structural member substantially free of internal voids or surface blemishes. The concentration of water present in the sawdust during the formation of pellet or linear extrudate when heated can flash from the surface of the newly extruded structural member and can come as a result of a rapid volatilization, form a steam bubble deep in the interior of the extruded member which can pass from the interior through the hot thermoplastic extrudate leaving a substantial flaw. In a similar fashion, subsurface water can bubble and leave cracks, bubbles or other surface flaws in the extruded member.

Trees when cut depending on relative humidity and season can contain from 30 to 300 wt-% water based on fiber content. After rough cutting and finishing into sized lumber, seasoned wood can have a water content of from 20 to 30 wt-% based on fiber content. Kiln dried sized lumber cut to length can have a water content typically in the range of 8 to 12%, commonly 8 to 10 wt-% based on fiber. Some wood source, such as poplar or aspen, can have increased moisture content while some hard woods can have reduced water content.

Because of the variation in water content of wood fiber source and the sensitivity of extrudate to water content control of water to a level of less than 8 wt-% in the pellet based on pellet weight is important. Structural members extruded in non-vented extrusion process, the pellet should be as dry as possible and have a water content between 0.01 and 5%, preferably less than 3.5 wt-%. When using vented equipment in manufacturing the extruded linear member, a water content of less than 8 wt-% can be tolerated if processing conditions are such that vented extrusion equipment can dry the thermoplastic material prior to the final formation of the structural member of the extrusion head.

The pellets or linear extrudate of the invention are made by extrusion of the polymer and fiber composite through an extrusion die resulting in a linear extrudate that can be cut into a pellet shape. The pellet cross-section can be any arbitrary shape depending on the extrusion die geometry. However, we have found that a regular geometric cross-sectional shape can be useful. Such regular cross-sectional shapes include a triangle, a square, a rectangle, a hexagonal, an oval, a circle, etc. The preferred shape of the pellet is a regular cylinder having a roughly circular or somewhat oval cross-section. The pellet volume is preferably greater than about 12 $mm^3$. The preferred pellet is a right circular cylinder, the preferred radius of the cylinder is at least 1.5 mm with a length of at least 1 mm. Preferably, the pellet has a radius of 1 to 5 mm and a length of 1 to 10 mm. Most preferably, the cylinder has a radius of 2.3 to 2.6 mm, a length of 2.4 to 4.7 mm, a volume of 40 to 100 $mm^3$, a weight of 40 to 130 mg and a bulk density of about 0.2 to 0.8 $gm/mm^3$.

We have found that the interaction, on a microscopic level, between the polymer mass and the fiber is an important element of the invention. We have found that the physical properties of an extruded member are improved when the polymer melt during extrusion of the pellet or linear member thoroughly wets and penetrates or amounts with the fiber particles. The thermoplastic material comprises an exterior continuous organic polymer phase with the wood particle dispersed as a discontinuous phase in the continuous polymer phase. The material during mixing and extrusion obtains an aspect ratio of at least 1.1 and preferably between 2 and 4, optimizes orientation such as at least 20 wt-%, preferably 30% of the fibers are oriented in an extruder direction and are thoroughly mixed and wetted by the polymer such that all exterior surfaces of the wood fiber are in contact with the polymer material. This means, that any pore, crevice, crack, passage way, indentation, etc., is fully filled by thermoplastic material. Such penetration as attained by ensuring that the viscosity of the polymer melt is reduced by operations at elevated temperature and the use of sufficient pressure to force the polymer into the available internal pores, cracks and crevices in and on the surface of the wood fiber.

During the pellet or linear extrudate manufacture, substantial work is done in providing a uniform dispersion of the wood into the polymer material. Such work produces substantial orientation which when extruded into a final structural member, permits the orientation of the fibers in the structural member to be increased in the extruder direction resulting in improved structural properties.

The pellet dimensions are selected for both convenience in manufacturing and in optimizing the final properties of the extruded materials. A pellet is with dimensions substantially less than the dimensions set forth above are difficult to extrude, pelletize and handle in storage. Pellets larger than the range recited are difficult to introduce into extrusion or injection molding equipment, and are different to melt and form into a finished structural member.

Polymer Materials

Polymers that can be used for forming the polymer composites of the invention are commonly organic fiber-forming compositions that can be formed from a variety of common polymeric polymers including addition polymers, condensation polymers, natural polymers, treated polymers, thermosetting or thermoplastic resins.

Useful thermosetting resins include phenolic resins, phenol-aldehyde resins, furan resins, amino-plast resins, alkyd resins, allyl resins, epoxy resins, epoxy prepregs, polyurethane resins, thermosetting polyester resins, polyamide bis-maleimide resin, polymaleimide-epoxy resin, polymaleimide-isocyanate resin, silicone resins, cyanate resins, a cyanate-epoxy resins, a cyanate-polymaleimide resins, and a cyanate-epoxy-polymaleimide resin; thermosetting so-called "IPN" as obtained by compounding the above thermosetting resins and engineering plastics such as polyamide (Nylon), aromatic polyester, polyetherimide, polyetherether ketone, polysulfone, and polyphenyleneether, and further adding a catalyst; crosslinkable resins obtained by compounding an organic peroxide as a crosslinking agent and a radical polymerizable polyfunctional compound, a thermosetting resin and the like to resins. Because of the nature of thermosetting resins, they cannot be further heat processed without severe distortion or destruction.

Polyamide polymer can be used in the preferred polymer composite. Preferred polyimides are typically made by a two step reaction involving contacting a tetrabasic acid dianhydride with an aromatic diamine giving first a polyamic acid which is then converted by heat or catalyst into a high molecular weight, linear polyamide.

Thermoplastic resins are also useful in the composite of the invention. Useful addition polymers include poly alpha-olefins, polyethylene, polypropylene, poly 4-methyl-pentene-1, ethylene/vinyl copolymers, ethylene vinyl acetate copolymers, ethylene acrylic acid copolymers, ethylene methacrylate copolymers, ethyl-methylacrylate copolymers, etc.; thermoplastic propylene polymers such as polypropylene, ethylene-propylene copolymers, etc.; vinyl chloride polymers and copolymers; vinylidene chloride polymers and copolymers; polyvinyl alcohols, acrylic polymers made from acrylic acid, methacrylic acid, methylacrylate, methacrylate, acrylamide and others. Fluorocarbon resins such as polytetrafluoroethylene, polyvinylidiene fluoride, and fluorinated ethylene-propylene resins. Styrene resins such as a polystyrene, alpha-methylstyrene, high impact polystyrene acrylonitrile-butadiene-styrene polymers and others and reinforced materials obtained by compounding glass, carbon, alumina, other fibers, fiber cloth, powder and other fillers to the above polymers of these, those having a glass transition temperature of at least 160° F. are preferred. In particular, polymers having a glass transition temperature of at least 140° F. and preferably a $T_g$ of 180° F. or more is preferred.

A variety of condensation polymers can also be used in the manufacture of the composites of the invention including nylon (polyamide) resins such as nylon 6, nylon 66, nylon 10, nylon 11, nylon 12, etc. A variety of polyester materials can be made from dibasic aliphatic and aromatic carboxylic acids and di or triols. Representative examples include polyethylene-teraphthlate, polybutylene teraphthlate and others.

Polycarbonates can also be used in the manufacture of the invention. Such polycarbonates are long chained linear polyesters of carbonic acid and dihydric phenols typically made by reacting phosgene ($COCl_2$) with bisphenol A materials resulting in transparent, tough, dimensionally stable plastics. A variety of other condensation polymers are used including polyetherimide, polysulfone, polyethersulfone, polybenzazoles, aromatic polysulfones, polyphenylene oxides, polyether ether ketone and others.

Preferred Polyvinyl Chloride Homopolymer, Copolymers and Polymeric Alloys

Polyvinyl chloride is a common commodity thermoplastic polymer. Vinyl chloride monomer is made from a variety of different processes such as the reaction of acetylene and hydrogen chloride and the direct chlorination of ethylene. Polyvinyl chloride is typically manufactured by the free radical polymerization of vinyl chloride monomer resulting in a useful thermoplastic polymer. After polymerization, polyvinyl chloride is commonly combined with thermal stabilizers, lubricants, plasticizers, organic and inorganic pigments, fillers, biocides, processing aids, flame retardants and other commonly available additive materials. Polyvinyl chloride can also be combined with other vinyl monomers in the manufacture of polyvinyl chloride copolymers. Such copolymers can be linear copolymers, branched copolymers, graft copolymers, random copolymers, regular repeating copolymers, block copolymers, etc. Monomers that can be combined with vinyl chloride to form vinyl chloride copolymers include a acrylonitrile; alpha-olefins such as ethylene, propylene, etc.; chlorinated monomers such as vinylidene chloride, chlorinated polyethylene, acrylate monomers such as acrylic acid, methylacrylate, methylmethacrylate, acrylamide, hydroxyethyl acrylate, and others; styrenic monomers such as styrene, alphamethyl styrene, vinyl toluene, etc.; vinyl acetate; and other commonly available ethylenically unsaturated monomer compositions.

Such monomers can be used in an amount of up to about 50 mol-%, the balance being vinyl chloride. Polymer blends or polymer alloys can be useful in manufacturing the pellet or linear extrudate of the invention. Such alloys typically comprise two miscible polymers blended to form a uniform composition. Scientific and commercial progress in the area of polymer blends has lead to the realization that important physical property improvements can be made not by developing new polymer material but by forming miscible polymer blends or alloys. A polymer alloy at equilibrium comprises a mixture of two amorphous polymers existing as a single phase of intimately mixed segments of the two macro molecular components. Miscible amorphous polymers form glasses upon sufficient cooling and a homogeneous or miscible polymer blend exhibits a single, composition dependent glass transition temperature ($T_g$). Immiscible or non-alloyed blend of polymers typically displays two or more glass transition temperatures associated with immiscible polymer phases. In the simplest cases, the properties of polymer alloys reflect a composition weighted average of properties possessed by the components. In general, however, the property dependence on composition varies in a complex way with a particular property, the nature of the components (glassy, rubbery or semi-crystalline), the thermodynamic state of the blend, and its mechanical state whether molecules and phases are oriented. Polyvinyl chloride forms a number of known polymer alloys including, for example, polyvinyl chloride/nitrile rubber; polyvinyl chloride and related chlorinated copolymers and terpolymers of polyvinyl chloride or vinylidine dichloride; polyvinyl chloride/alphamethyl styrene-acrylonitrile copolymer blends; polyvinyl chloride/polyethylene; polyvinyl chloride/chlorinated polyethylene and others.

The primary requirement for the substantially thermoplastic polymeric material is that it retain sufficient thermoplastic properties to permit melt blending with wood fiber, permit formation of linear extrudate pellets, and to permit the composition material or pellet to be extruded or injection molded in a thermoplastic process forming the rigid structural member. Polyvinyl chloride homopolymers copolymers and polymer alloys are available from a number of manufacturers including Geon, Vista, Air Products, Occidental Chemicals, etc. Preferred polyvinyl chloride materials are polyvinyl chloride homopolymer having a molecular weight ($M_n$) of about 90,000±50,000, most preferably about 88,000±10,000.

Short Fiber

The polymer fiber composite compounds of the invention preferably contains a blend of a collection of short fiber and a collection of long fiber. The term short fiber typically suggests the fiber with an aspect ratio of less than about 10, preferably less than 5. The short fiber has a maximum dimension of about 1 mm, but typically fiber size is less than about 0.8 mm, typically less than or equal to 0.4 mm. We have found that short fiber used in the composite is preferably a cellulosic fiber such as fiber derived from cotton, wood, or other similar cellulosic fiber sources; inorganic filler materials such as mica or glass-like materials such as glass fiber, borosilicate glass fiber, etc. The preferred wood fiber for use in the invention is a wood fiber typically derived from forest resources as a direct product of wood processing or as a recycled or waste stream from wood manufacture.

The fiber fraction of the polymer fiber composite contains a blend of the first and second fibers as described. The second fiber having the larger aspect ratio of the two fibers in the blend cooperates with the first fiber to provide superior engineering properties. Accordingly, the second fiber is present as a proportion of the total fiber in the composite at a proportion of at least 1% by weight of the composite as a whole. The second fiber is preferably present in an amount of about 2 to about 35 wt-% of the composite most preferably about 10 to 25 wt-% of the composite. The first fiber is typically present at similar proportions. The first fiber can be present in an amount of about 5 to about 50 wt-% of the composite, preferably about 7 to 40 wt-% of the composite, most preferably about 10 to 30 wt-% of the composite. The total fiber component of the composite comprising both first and second fiber ingredients, typically comprises less than about 50 wt-% of the composite taken as a whole. Preferably, the composite comprises about 50 to 75 wt-% polymer and about 25 to 50 wt-% total fiber.

Wood fiber, in terms of abundance and suitability can be derived from either soft woods or conifers or from hard woods commonly known as broad leaf deciduous trees. Soft woods are generally preferred for fiber manufacture because the resulting fibers are longer, contain high percentages of lignin and lower percentages of hemicellulose than hard woods. While soft wood is the primary source of fiber for the invention, additional fiber make-up can be derived from a number of secondary or fiber reclaim sources including bamboo, rice, sugar cane, and recycled fibers from newspapers, boxes, computer printouts, etc.

However, the primary source for wood fiber of this invention comprises the wood fiber by-product of sawing or milling soft woods commonly known as sawdust or milling tailings. Such wood fiber has a regular reproducible shape and aspect ratio. The fibers based on a random selection of about 100 fibers are commonly about 3 mm in length or smaller, about 3 mm in thickness or smaller and commonly have an aspect ratio of about 1.8 to 10. Preferably, the fibers are 0.05 to 2 mm in length, 0.01 to 1.5 mm in thickness with an aspect ratio between 2 and 7, preferably 2.5 to 6.0. The preferred fiber for use in this invention are fibers derived from processes common in the manufacture of windows and doors. Wooden members are commonly ripped or sawed to size in a cross grain direction to form appropriate lengths and widths of wood materials. The by-product of such sawing operations is a substantial quantity of sawdust. In shaping a regular shaped piece of wood into a useful milled shape, wood is commonly passed through machines which selectively removes wood from the piece leaving the useful shape. Such milling operations produces substantial quantities of sawdust or mill tailing by-products. Lastly, when shaped materials are cut to size and mitered joints, butt joints, overlapping joints, mortise and tenon joints are manufactured from pre-shaped wooden members, substantial waste trim is produced. Such large trim pieces are commonly cut and machined to convert the larger objects into wood fiber having dimensions approximating sawdust or mill tailing dimensions. The wood fiber sources of the invention can be blended regardless of particle size and used to make the composite. The fiber stream can be pre-sized to a preferred range or can be sized after blending. Further, the fiber can be pre-pelletized before use in composite manufacture.

Such sawdust material can contain substantial proportions of waste stream by-products. Such by-products include waste polyvinyl chloride or other polymer materials that have been used as coating, cladding or envelope on wooden members; recycled structural members made from thermoplastic materials; polymeric materials from coatings; adhesive components in the form of hot melt adhesives, solvent based adhesives, powdered adhesives, etc.; paints including water based paints, alkyd paints, epoxy paints, etc.; preservatives, anti-fungal agents, anti-bacterial agents, insecticides, etc., and other waste streams common in the manufacture of wooden doors and windows. The total waste stream content of the wood fiber materials is commonly less than 25 wt-% of the total wood fiber input into the polyvinyl chloride wood fiber product. Of the total waste recycle, approximately 10 wt-% of that can comprise a vinyl polymer commonly polyvinyl chloride. Commonly, the intentional recycle ranges from about 1 to about 25 wt-%, preferably about 2 to about 20 wt-%, most commonly from about 3 to about 15 wt-% of contaminants based on the sawdust.

Long fiber

For the purpose of this invention, the term fiber indicates a fiber source comprising fiber having particles with dimensions and aspect ratios that generally correspond to the ranges disclosed below. However, the term fiber does include some proportions of fiber that fall outside the dimensions. The major proportion of fiber, fall within the ranges disclosed. It should be understood that any fiber source comprises a broad distribution of fiber sizes and aspect ratios. The existence of some proportion of fiber outside the claimed range does not avoid the claims.

Composition and Pellet Manufacture

The manufacture of the dispersed fiber phase within a continuous polymer phase requires substantial mechanical input. Such input can be achieved using a variety of mixing means including preferably extruder mechanisms wherein the materials are mixed under conditions of high shear until the appropriate degree of wetting and intimate contact is achieved. After the materials are fully mixed, the moisture content can be controlled at a moisture removal station. The heated composite is exposed to atmospheric pressure or reduced pressure at elevated temperature for a sufficient period of time to remove moisture resulting in a final moisture content of about 8 wt-% or less. Lastly, the polymer fiber is aligned and extruded into a useful form.

The preferred equipment for mixing and extruding the composition and wood pellet of the invention is an industrial extruder device. Such extruders can be obtained from a variety of manufacturers including Cincinnati Millicron, etc. The fiber can be preblended or blended into the extruder contents.

The materials feed to the extruder can comprise from about 10 to 60 wt-% of mixed long and short fiber (including optimal recycled impurity) along with from about 40 to 90 wt-% of polymer preferably polyvinyl chloride polymer compositions. Preferably, about 30 to 50 wt-% mixed fiber is combined with 70 to 50 wt-% polyvinyl chloride homopolymer.

The following examples were performed to further illustrate the invention that is explained in detail above. The following information illustrates the typical production conditions and compositions and the tensile modulus of a structural member made from the pellet. The following examples and data contain a best mode.

EXPERIMENTAL

Preparation and testing of mixed fiber length composites using cotton linter pulp, Owens Corning 497 DB 0.125 inch chopped fiber glass and American Wood Fibers 40 mesh sawdust.

Experimental Procedure:

PVC compound was blended in a Littleford laboratory blender using the following procedure: Resin (Geon 427, IV=0.92) and Morton TM 181 (tin mercaptide heat stabilizer) were added to the blender and allowed to mix until the temperature reached 130 degrees F. The blender was stopped and the remaining ingredients found in Table 1 were added and blended until the temperature reached 195 degrees F. The powdered PVC compound was mixed with 40 mesh sawdust and either cotton linter fiber or fiber glass. The formulations of the PVC compound and the ratios of the fibers are shown on the top of Table 1. As a control, samples were run with the base resin and fiber glass only.

centigrade for zones 1–5 respectively. The 100 percent sawdust filled and fiber glass filled samples were directly extruded without being compounded in the mixer.

Samples were retained from both extrusion passes for Instron physical testing using standard test method #2 (0.0500 inches/minute crosshead speed, 2 inch gauge length extensometer, and 1124 pound load cell). Samples were allowed to equilibrate at ambient conditions for 24 hours before Instron testing. Results of the testing are found in Table 1. Gardner impact testing (ASTM Method D3029) was done on one inch wide strips at room temperature using an 0.87 pound weight and a 0.5 inch diameter impactor.

TABLE

FIBER SIZES USED IN THE EXPERIMENTAL WORK

| | COTTON Long | | FIBERGLASS Long | | WOOD Short (35 Mesh) | | WOOD Short (18 Mesh) | |
|---|---|---|---|---|---|---|---|---|
| | Length | Diameter | Length | Diameter | Length | Diameter | Length | Diameter |
| | 0.3–0.5 | 0.000592 | 0.11189 | 0.000608 × 5 | | | | |
| | | 0.000605 | 0.1217 | 0.000532 × 2 | | | | |
| | | 0.000608 | 0.1185 | | | | | |
| | | 0.000410 | 0.1169 | | | | | |
| | | 0.000942 | 0.1232 | | | | | |
| | | 0.000653 | 0.1220 | | | | | |
| | | 0.001171 | 0.1220 | | | | | |
| | | 0.000516 | 0.1232 | | | | | |
| | | 0.000302 | 0.1256 | | | | | |
| | | 0.000329 | | | | | | |
| Average | 0.4 | 0.000613 | | | 1.45 | 0.57 | 3.84 | 0.73 |
| Aspect Ratio* | 653 | | 207 | | 2.81 | 9.00 | | |

Cotton linter fiber was obtained from Buckeye Cellulose Corporation of Memphis, Tenn. The fiber was used as obtained and had a moisture content of 4 percent. The 40 mesh sawdust was obtained from American Wood Fibers of Schofield, Wis. The sawdust had a moisture content of 6 percent. Fiber ratios reported are on a dry fiber basis. Fiber glass used in this experiment is Owens Corning 497 DB obtained from the manufacture. Cotton linter fibers and fiber glass used in this experiment have an aspect ratio (length/wide) of greater than 100, the sawdust has a ratio of less than 3.

Cotton linter samples were compounded on the Brabender Prep Mixer, equipped with roller blades, for 12 minutes at 30 rpm and 185 degrees centigrade. Fluxed material from the Prep Mixer was ground in a Cumberland rotary grinder and extruded on the Brabender laboratory (35 mm parallel twin screw) extruder. Cotton linter samples were reground and run a second pass. Extrusion conditions were as follows: 15 rpm, temperatures of 195, 185, 180, 175, 180 degrees Results:

Results of the Instron physical property testing is found in Table 1. FIG. 1, which illustrates tensile modulus versus percent cotton linter fiber, depicts the break point in physical properties at the 20 percent long fiber concentration. FIG. 2, tensile modulus versus glass fiber concentration, shows a similar trend with an improvement in the graph containing 40% wood fiber. FIG. 3, impact energy versus percent fiber glass, portrays the same trends of a threshold level of addition. The increased impact energy at (e.g.) 15%–30% glass and 40% wood fiber is surprising. There is a corresponding threshold value for both high aspect ratio fibers. Composites samples with long fiber concentration of greater than 20 percent exhibit a high percentage the enhanced properties of the composites containing a greater fraction of long fiber. Composites with less than 20 percent of the long fiber are closer to the physical property characteristics of the pure sawdust composites.

TABLE 1

| STABILIZER | TM 181 | TM 181 | TM 181 | TM 181 | TM 181 |
|---|---|---|---|---|---|
| MANUFACTURE | Morton | Morton | Morton | Morton | Morton |
| FORM | Liquid | Liquid | Liquid | Liquid | Liquid |
| PHR | 1.50 | 1.50 | 1.50 | 1.50 | 1.50 |
| Witco CA STEARATE | 1.50 | 1.50 | 1.50 | 1.50 | 1.50 |
| Allied Signal AC | 0.20 | 0.20 | 0.20 | 0.20 | 0.20 |
| 629 | 2.50 | 2.50 | 2.50 | 2.50 | 2.50 |
| Rohm & Haas K 120N | 1.00 | 1.00 | 1.00 | 1.00 | 1.00 |
| Henkle HOB 7162 | 4.00 | 4.00 | 4.00 | 4.00 | 4.00 |
| Henkle VGE 1884 | | | | | |
| Wood Fiber | 0% | 10% | 20% | 30% | 40% |
| (40 Mesh- 0.4 mm) | 40% | 30% | 20% | 10% | 0% |
| % Long Fiber | COTTON | COTTON | COTTON | COTTON | COTTON |

TABLE 1-continued

| LONG FIBER TRIAL # Mean 1 st Pass | 6 | 7 | 8 | 9 | 10 |
|---|---|---|---|---|---|
| Modulus | 1145353 | 1118116 | 1131603 | 1045883 | 1028063 |
| % Strain | 0.86 | 1.03 | 1.03 | 1.11 | 1.13 |
| Max Stress | 7345 | 7457 | 7136 | 6777 | 6263 |
| Toughness | 36.05 | 47.47 | 46.40 | 48.60 | 48.78 |
| Impact Energy 1p | 17.2 | 14.2 | 12.2 | 9.6 | 7.7 |
| Impact Energy 2p | 12.8 | 12 | 12.1 | 9.1 | 8.3 |

TABLE 2

| STABILIZER | TM 181 | TM 181 | TM 181 | TM 181 | TM 181 | TM 181 | TM 181 |
|---|---|---|---|---|---|---|---|
| MANUFACTURE | Morton | Morton | Morton | Morton | Morton | Morton | Morton |
| FORM | Liquid | Liquid | Liquid | Liquid | Liquid | Liquid | Liquid |
| PHR | 1.50 | 1.50 | 1.50 | 1.50 | 1.50 | 1.50 | 1.50 |
| Witco CA STEARATE | 1.50 | 1.50 | 1.50 | 1.50 | 1.50 | 1.50 | 1.50 |
| Allied Signal AC 629 | 0.20 | 0.20 | 0.20 | 0.20 | 0.20 | 0.20 | 0.20 |
| Rohm & Haas K 120N | 2.50 | 2.50 | 2.50 | 2.50 | 2.50 | 2.50 | 2.50 |
| Henkle HOB 7162 | 1.00 | 1.00 | 1.00 | 1.00 | 1.00 | 1.00 | 1.00 |
| Henkle VGE 1884 | 4.00 | 4.00 | 4.00 | 4.00 | 4.00 | 4.00 | 4.00 |
| Wood Fiber 0.4 mm | 0% | 30% | 20% | 25% | 30% | 35% | 40% |
| % Long Fiber | 40% | 30% | 20% | 15% | 10% | 5% | 0% |
| LONG FIBER | GLASS | GLASS | GLASS | GLASS | GLASS | GLASS | NONE |
| TRIAL # | 1 | 2 | 3 | 4 | 5 | 6 | 7 |
| Instron Modulus | 1885736 | 1659249 | 1393888 | 1396054 | 1271453 | 1291333 | 1341020 |
| % Strain | 1.10 | 1.28 | 1.33 | 1.17 | 1.13 | 1.01 | 0.73 |
| Max Stress | 12670 | 12070 | 9950 | 9044 | 7780 | 7305 | 6264 |
| Impact Energy 1p | 100 | 63.3 | 27.6 | 14.8 | 17.2 | 12.8 | 9.5 |
| St. Dev | | 60.2 | 1.5 | 1.1 | 1.2 | 0.3 | 0.4 |
| Imact Energy 2p | | | | | | | |

| STABILIZER | TM 181 | TM 181 | TM 181 | TM 181 | TM 181 | TM 181 |
|---|---|---|---|---|---|---|
| MANUFACTURE | Morton | Morton | Morton | Morton | Morton | Morton |
| FORM | Liquid | Liquid | Liquid | Liquid | Liquid | Liquid |
| PHR | 1.50 | 1.50 | 1.50 | 1.50 | 1.50 | 1.50 |
| Witco CA STEARATE | 1.50 | 1.50 | 1.50 | 1.50 | 1.50 | 1.50 |
| Allied Signal AC 629 | 0.20 | 0.20 | 0.20 | 0.20 | 0.20 | 0.20 |
| Rohm & Haas K 120N | 2.50 | 2.50 | 2.50 | 2.50 | 2.50 | 2.50 |
| Henkle HOB 7162 | 1.00 | 1.00 | 1.00 | 1.00 | 1.00 | 1.00 |
| Henkle VGE 1884 | 4.00 | 4.00 | 4.00 | 4.00 | 4.00 | 4.00 |
| Wood Fiber 0.4 mm | | | | | | |
| % Long Fiber | 30% | 20% | 15% | 10% | 5% | 0% |
| LONG FIBER | GLASS | GLASS | GLASS | GLASS | GLASS | NONE |
| TRIAL # | 8 | 9 | 10 | 11 | 12 | 13 |
| Instron Modulus | 1317668 | 1009488 | 857185 | 729975 | 582300 | 494232 |
| % Strain | 0.98 | 1.41 | 1.78 | 1.96 | 2.54 | |
| Max Stress | 10358 | 10105 | 9580 | 8393 | 8140 | 7215 |
| Impact Energy 1p | 22.1 | 12.7 | 9.1 | 6.1 | 18.6 | 80 |
| St. Dev | 3 | 0.7 | 1.9 | 2.1 | 3.2 | |
| Imact Energy 2p | | | | | | |

The foregoing disclosure provides an explanation of the compositions and properties of the mixed fiber containing thermoplastic material. Many alterations, variations and modifications of the invention arising in the extruded material can be made by substitution of equivalent materials, rearrangement of the compositions, variations of the proportions, etc. Accordingly, the invention resides in the claims hereinafter appended.

We claim:

1. A polymer and wood fiber composite capable of formation into a structural member, which composite comprises:

(a) a continuous phase of a thermoplastic polymer; and
   (b) about 5 to 60 wt-% of a mixed fiber comprising a blend of a collection of a first fiber having a thickness of less than about 0.5 mm and an aspect ratio of greater than about 20 with a collection of a second fiber having a maximum dimension of less than about 1 mm and an aspect ratio of about 1.8 to 10 wherein said second collection is present in an amount greater than that produced through breakage of said first collection in the extrusion processing of the composite;

wherein the mixed fiber collections are dispersed throughout a continuous polymer phase.

2. The composition of claim 1 wherein the polymer comprises a polyvinyl chloride homopolymer.

3. The composition of claim 1 wherein the polymer comprises a polyvinyl chloride copolymer.

4. The pellet of claim 1 wherein the first fiber has thickness of less than about 0.5 mm and a minimum aspect ratio of about 50.

5. The pellet of claim 1 wherein the first fiber has a minimum aspect ratio of about 100.

6. The composition of claim 1 wherein the second fiber has a fiber width of about 0.001 to 0.1 mm, a fiber length of less than about 0.01 to 1 mm and a aspect ratio of about 2 to 7.

7. The composition of claim 4 wherein the second fiber comprises a wood fiber with an aspect ratio less than 5.

8. The composition of claim 7 wherein the wood fiber comprises sawdust.

9. The composition of claim 2 wherein the polymer has a molecular weight ($M_n$) of about 90,000±50,000.

10. The composition of claim 2 wherein the copolymer has a molecular weight ($M_n$) of about 88,000±10,000.

11. The composite of claim 1 wherein the first fiber is different than the second fiber in fiber composition.

12. A composite composition, capable of extrusion into a dimensionally stable structural member, which composition comprises:
   (a) about 40 to 70 wt-% of a polymer comprising vinyl chloride;
   (b) about 30 to 50 wt-% of a mixed fiber, the mixed fiber comprising a first fiber collection comprising a cotton fiber, a glass fiber, a synthetic polymer fiber, or mixtures thereof, having a thickness of less than about 0.5 mm and a minimum aspect ratio of about 50 and a second fiber collection comprising wood fiber having a maximum dimension of less than about 10 mm and an aspect ratio of about 1.8 to about 10;
wherein the mixed fiber is dispersed throughout a continuous polymer phase; and
   (c) less than about 10 wt-% water;
wherein the mixed fiber is dispersed throughout a continuous polymer phase.

13. The composition of claim 12 wherein the polymer has a molecular weight ($M_n$) of about 90,000±50,000.

14. The composition of claim 12 wherein the copolymer has a molecular weight ($M_n$) of about 88,000±10,000.

15. The composition of claim 12 wherein the wood fiber has a fiber width of about 0.003 to 0.1 mm, a fiber length of about 0.1 to 3 mm and a aspect ratio of about 2 to 7.

16. The composition of claim 12 wherein the concentration of water comprises about 0.01 to 3.5 wt-% of the composition.

17. The composition of claim 12 wherein the first fiber has a fiber width of about 0.003 mm to about 0.1 mm and an aspect ratio greater than about 50.

18. The composition of claim 17 wherein the aspect ratio is greater than about 100.

19. A composite pellet, capable of formation into a structural member, which pellet comprises a cylindrical extrudate having a radius of about 1 to 5 mm, a length of about 1 to 10 mm, the pellet composition comprising:
   (a) a continuous phase of a thermoplastic polymer; and
   (b) about 5 to 60 wt-% of a mixed fiber comprising a blend of a collection of a first fiber having an aspect ratio of greater than about 20 with a collection of a second fiber having an aspect ratio of about 1.8 to 10 wherein said second collection is present in an amount greater than that produced through breakage of said first collection in the extrusion processing of the composite pellet;
wherein the mixed fiber collections are dispersed throughout a continuous polymer phase.

20. The pellet of claim 19 wherein the polymer comprises a polyvinyl chloride homopolymer.

21. The pellet of claim 19 wherein the polymer comprises a polyvinyl chloride copolymer.

22. The pellet of claim 19 wherein the second fiber has a fiber width of about 0.003 to 0.1 mm, a fiber length of about 0.01 to 1 mm and a aspect ratio of about 2 to 7.

23. The pellet of claim 22 wherein the second fiber comprises a wood fiber with an aspect ratio less than 5.

24. The pellet of claim 23 wherein the wood fiber comprises sawdust.

25. The pellet of claim 22 wherein the first fiber has thickness of less than about 0.5 mm and a minimum aspect ratio of about 50.

26. The pellet of claim 22 wherein the first fiber has a minimum aspect ratio of about 100.

27. The pellet of claim 20 wherein the polymer has a molecular weight ($M_n$) of about 90,000±50,000.

28. The pellet of claim 21 wherein the copolymer has a molecular weight ($M_n$) of about 88,000±10,000.

29. The composite of claim 19 wherein the first fiber is different than the second fiber in fiber composition.

30. The composite of claim 29 wherein the first fiber comprises a glass fiber and the second fiber comprises a cellulosic fiber.

31. The composite of claim 11 wherein the first fiber comprises a glass fiber and the second fiber comprises a cellulosic fiber.

* * * * *